United States Patent [19]
Alshawi

[11] Patent Number: 5,870,706
[45] Date of Patent: Feb. 9, 1999

[54] METHOD AND APPARATUS FOR AN IMPROVED LANGUAGE RECOGNITION SYSTEM

[75] Inventor: Hiyan Alshawi, Essex County, N.J.

[73] Assignee: Lucent Technologies, Inc., Murray Hill, N.J.

[21] Appl. No.: 631,874

[22] Filed: Apr. 10, 1996

[51] Int. Cl.$^6$ .................................................. G10L 5/02
[52] U.S. Cl. .......................... 704/255; 704/256; 704/251
[58] Field of Search ..................................... 395/2.6–2.65, 395/2.2

[56] References Cited

U.S. PATENT DOCUMENTS

| | | | |
|---|---|---|---|
| 4,718,094 | 1/1988 | Bahl et al. | 381/43 |
| 4,866,778 | 9/1989 | Baker | 395/2.52 |
| 4,947,438 | 8/1990 | Paeseler | 381/43 |
| 5,033,088 | 7/1991 | Shipman | 395/2.52 |
| 5,222,187 | 6/1993 | Doddington et al. | 704/200 |
| 5,233,681 | 8/1993 | Bahl et al. | 395/2 |
| 5,297,040 | 3/1994 | Hu | 364/419.08 |
| 5,384,892 | 1/1995 | Strong | 395/2.52 |
| 5,390,279 | 2/1995 | Strong | 395/2 |
| 5,434,906 | 7/1995 | Robinson et al. | 379/67 |
| 5,526,259 | 6/1996 | Kaji | 364/419.03 |
| 5,526,463 | 6/1996 | Gillick et al. | 395/2.6 |
| 5,584,024 | 12/1996 | Shwartz et al. | 395/604 |
| 5,606,644 | 2/1997 | Chou et al. | 395/2.52 |
| 5,608,624 | 3/1997 | Luciw | 395/794 |
| 5,615,286 | 3/1997 | Patel | 382/224 |
| 5,615,296 | 3/1997 | Stanford et al. | 395/2.1 |
| 5,621,859 | 4/1997 | Schwartz et al. | 395/2.65 |
| 5,625,814 | 4/1997 | Luciw | 395/605 |

OTHER PUBLICATIONS

Gorin et al., ("Automated Call Routing in a Telecommunications Network", 2nd IEEE Workshop on Interactive Voice Technology for Telecommunications Applications, Kyoto Research Park, Kyoto, Japan, Sep. 26–27, 1994, pp. 137–140).

Gorin et al., ("An Experiment in Spoken Language Acquisition", IEEE Transactions on Speech and Audio Processing, vol. 2, No. 1, Part II, Jan. 1994, pp. 224–240).

Gorin et al., ("On Adaptive Acquisition of Spoken Language", Neural Networks for Signal Processing, Aug. 1991, pp. 422–431).

Miller et al., ("Structured Network Architecture for Adaptive Language Acquisition", ICASSP'92: Acoustics, Speech & Signal Processing Conference, vol. 1, Sep. 1992, pp. 201–204).

Cole et al., ("The Challenge of Spoken Language Systems: Research Directions for the Nineties", IEEE Transactions on Speech and audio Processing, Jan. 1995, vol. 3, Issue 1, pp. 1–21).

Lee, Kai–Fu; "Large Vocabulary Speaker Indpendent Continuous Speech Recognition: The Sphinx system", Apr. 18, 1988; Computer Science Department, Carnegie Mellon University.

*Primary Examiner*—David R. Hudspeth
*Assistant Examiner*—Michael N. Opsasnick

[57] ABSTRACT

Methods and apparatus for a language model and language recognition systems are disclosed. The method utilizes a plurality of probabilistic finite state machines having the ability to recognize a pair of sequences, one sequence scanned leftwards, the other scanned rightwards. Each word in the lexicon of the language model is associated with one or more such machines which model the semantic relations between the word and other words. Machine transitions create phrases from a set of word string hypotheses, and incrementally calculate costs related to the probability that such phrases represent the language to be recognized. The cascading lexical head machines utilized in the methods and apparatus capture the structural associations implicit in the hierachical organization of a sentence, resulting in a language model and language recognition systems that combine the lexical sensitivity of N-gram models with the structural properties of dependency grammar.

13 Claims, 4 Drawing Sheets

METHOD AND APPARATUS FOR AN IMPROVED LANGUAGE RECOGNITION SYSTEM

FIELD OF THE INVENTION

The present invention relates generally to language recognition. More particularly, the present invention relates to an improved language recognition system utilizing a probabilistic lexical associations model.

BACKGROUND OF THE INVENTION

Speech recognition is a process by which an unknown speech utterance ("input signal") is identified. Speech recognition typically involves a signal processing stage in which a plurality of word string hypotheses, i.e., possible word sequences, are proposed for the input signal. The task is then to recognize or identify the "best" word string from a set of hypotheses, i.e., proposed word strings consistent with the input signal. Speech recognition systems utilize a language model for such a purpose.

Typical speech recognition systems may employ a quantitative language model. Quantitative models associate a "cost" with each hypothesis, selecting the lowest cost hypothesis as the recognized word string.

One example of a quantitative model is a probabilistic language model. Probabilistic models assign probabilities to word strings and choose the string that has the highest probability of representing a given input signal. The probability calculation can be performed using a variety of methods. One such method, referred to as the N-gram model, specifies the probability of a word that is part of a string conditional on the previous N-1 words in the string. See, for example, Jelinek et al., "Principles of Lexical Language Modeling for Speech Recognition," Adv. Speech Signal Processing, pp. 651–699 (1992). This article, and all other articles mentioned in this specification, are incorporated herein by reference. The N-gram model is lexically sensitive in that the parameters of the model are associated with particular lexical items, i.e., words. This sensitivity allows the model to capture local distributional patterns that are idiosyncratic to particular words.

A second method, referred to as stochastic context-free grammar, uses a tree-like data structure wherein words within an input signal appear as fringe nodes of a tree. Probabilities are assigned as the sum of probabilities of all tree derivations for which words in the candidate string appear as fringe nodes. See, for example, Jelinek et al., "Computation of the Probability of Initial Substring Generation by Stochastic Context-Free Grammers," Computational Linguistics, v. 17(3), pp. 315–324 (1991). In context-free grammars, structural properties are modeled, i.e., the probability that a phrase of a particular category, e.g., noun or verb phrases, can be decomposed into subphrases of specified categories.

Both of the aforementioned methods for assessing probability suffer from disadvantages. The N-gram model, while lexically sensitive, suffers as a result of its failure to capture meaningful long range associations between words. When grammar is ignored, useful information that can only be derived from grammatical relationships between words is lost. While a stochastic context-free grammar is sensitive to such grammatical relationships, it fails to capture associations between lexical items that reflect semantic information that makes one string much more likely than another. A language model that fails to consider both semantic and structural information inevitably suffers from a loss in accuracy.

The prior art probability models are typically compiled into one large state machine. The aforementioned drawback of the lexically-sensitive probability models are due, in part, to this structure. The machines usually implemented for speech recognition are typically limited to moving left to right through the word string hypotheses, processing word strings in a word-by-word manner. As a result, the long-range associations between words are lost.

Compiling stochastic context-free grammars, or, more properly, approximations of such grammars, into one large state machine does not limit the ability of those models to capture long-range associations. As previously discussed, such associations are captured due to the nature of the model. There is another drawback, however, related to the use of a single large state machine that affects both types of probability models. When compiling the model into one large state machine, the complete lexicon or vocabulary of the language model must be contained therein. In the typical case of a software implementation, such state machines become too large for computers with limited RAM memory.

Thus, there is a need for a language model that possesses both lexical and structural sensitivity, and when implemented in software, is compact enough to be installed on computers having limited RAM memory.

SUMMARY OF THE INVENTION

Methods and apparatus for an improved language model and language recognition systems are disclosed. According to the present invention, a plurality of "small" finite state machines drive the language model. Each of such machines have the ability to recognize a pair of sequences, one scanned leftwards, the other scanned rightwards. Each finite state machine, referred to herein as a lexical head machine, corresponds to a word in the vocabulary of the language model. Only the lexical head machines corresponding to the words contained in the word string hypotheses are activated according to the present methods.

The activated lexical head machines build or derive phrases from the words contained in the word string hypotheses, by a series of left or right transitions. A plurality of such phrases are created by the lexical head machines for the various words as they form associations with other words in the word string hypotheses. The lexical head machines incrementally compute a "cost" for the derived phrases. The cost relates to the probability that the derived phrase matches the input language signal. The lowest cost phrase is selected as the phrase that corresponds to the input language signal.

As noted above, the present method utilizes a limited set of "small" lexical head machines corresponding to the words in the word string hypotheses rather than one "large" state machine incorporating the entire vocabulary. As such, the present methods and apparatus can be implemented using significantly less RAM memory than prior art language recognition systems.

The finite state machines of the present invention that recognize a pair of sequences are distinct from so-called "two-way" finite state machines that can move either left or right but recognize only a single sequence. Such two-way machines are known in the art and have the same recognition power as finite state machines that can move only left to right. See, for example, Hopcroft et al., *Introduction to Automata Theory Languages, and Computation*, (Addison Wesley, 1979).

Notwithstanding such two-way state machines, the state machines typically used in the prior art for speech recognition are usually limited to processing word strings by moving from left to right, whereas the lexical head machines utilized in the present invention simultaneously scan the input to the left and right of particular words in the middle of the string. This results in more accurate predictions of adjoining words since processing can start with a less common word, which limits the possibilities for the adjoining word. Consider the following example sentence: "I want the transistor." A state machine constrained to processing from left to right will have to select the word following "the", i.e., "I want the ?". Presumably, a large number of words in the particular vocabulary being used can suitably follow the word "the" in the example sentence. The lexical head machines of the present invention that process in either direction are free to start with the word "transistor" and select the preceding word. There are far fewer choices for words that can suitably precede the word "transistor" than follow the word "the."

By virtue of using a plurality of small lexical head machines, the present methods and apparatus are both lexically and structurally sensitive. Lexical associations are captured because every head machine transition involves costs tied to particular lexical items, i.e., word associations. The structural associations implicit in the hierarchical organization of a sentence is captured as a result of the cascade of lexical head machines.

BRIEF DESCRIPTION OF THE DRAWINGS

Further features of the invention will become more apparent from the following detailed description of specific embodiments thereof when read in conjunction with the accompanying drawings in which.

DETAILED DESCRIPTION

The present invention relates to language modelling methods for use in a variety of language recognition applications. The role of the language model in language recognition involves identifying the "best" word string from a set of word string hypotheses developed by other parts of the language recognition system. The present invention will be described in the context of speech recognition. It should be understood, however, that the present methods are applicable to all modalities of language recognition, including, without limitation, handwriting recognition and optical character recognition. It should also be appreciated that the present methods may be implemented as software or hardware.

Figure 1:
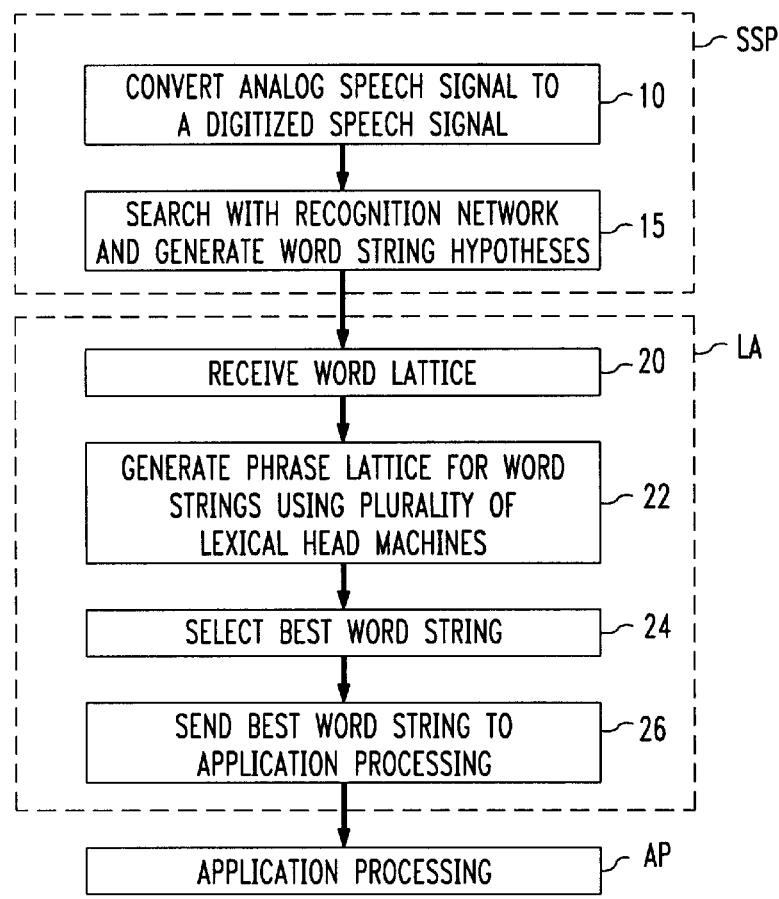
FIG. 1 illustrates a method according to the present invention for implementing a speech recognition system.

FIG. 1 is an illustration of a speech recognition method according to the present invention. Reduced to its basics, such a method may include speech signal processing SSP, language analysis LA and application processing AP.

The method begins with speech signal processing SSP wherein a speech signal is accepted and a set of word string hypotheses consistent with such speech signal are generated. In a speech recognition system, the word string hypotheses are generated by what is referred to as an "acoustic model". Such models are well known to those skilled in the art.

In more detail, speech signal processing SSP includes converting an analog speech signal to a digitized speech signal in operation block 10 and searching with a recognition network and generating word string hypotheses in operation block 15. As utilized in the present language recognition methods, such signal processing generates the word string hypotheses as a sequencing of words, whether processing a speech signal or whether such processing pertains to other modalities of language recogition. Such word sequencing can include, without limitation, an explicit set of candidate word strings, or, preferably, a word lattice data structure. The word lattice is a well known construct for storing a collection of possible strings allowing substrings to be shared. The techniques referenced in operation blocks 10 and 16 are well known in the art.

Language analysis LA accepts the word string hypotheses and, using a language model according to the present teachings, selects therefrom the best word string. The methods and apparatus of the present invention pertain, in particular, to this aspect of the language recognition process. The present language model can then be implemented in an language recognition system, such as the speech recognition system presently being described.

In more detail, the word string hypotheses are received from speech signal processing SSP in operation block 20. The language model is applied to generate and rank a list of possible word strings or phrases corresponding to the input speech signal in operation block 22. In operation block 24, the best word string is selected and, as indicated in operation block 26, the best word string is sent to application processing AP. Application processing thus accepts the best string and then processes that string as appropriate, e.g., translation, transcription or the like. Having described where the methods and apparatus for the present language model fit in a language recognition process or system according to the present invention, the present language model and methods for its implementation will now be described in detail.

Figure 2:
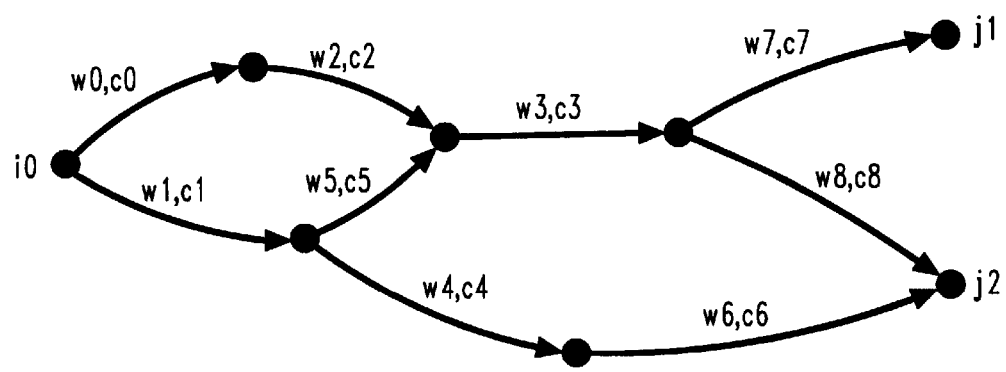
FIG. 2 is an illustration of a word lattice.

As previously described, language analysis LA receives a set of word string hypotheses. Preferably, such word strings are in the form of a word lattice, i.e., a directed acyclic graph. An exemplary word lattice is illustrated in FIG. 2. The word lattice has a set of initial nodes I, represented in FIG. 2 by i0 and a set of final nodes J, represented in FIG. 2 by j1 and j2. The hypotheses represented by the word lattice correspond to possible paths from the set of initial nodes I to the set of final nodes J.

The word lattice is also characterized by a plurality of "lattice arcs" or "word arcs" that are labeled with a word, w, between two positions that represent time points for speech. The arcs are also labeled with a cost, $c_0$, that reflects how well the word matches that portion of the input signal. For example, in FIG. 2, the word arcs are labeled w0, c0 through w8, c8. The lattice and costs are generated during speech signal processing SSP using techniques well known in the art. The word arc cost is accumulated by the present method and thus contributes to the cost of a phrase thereby playing a role in determining the best phrase.

The set of arcs in the input word lattice can thus be represented by a set of records of the form <w, i, j, $c_0$> in which i and j are indices for the lattice nodes. For a lattice produced from a speech signal, the usual interpretation of such an arc record is that word w matches the input speech signal from time position i to time position j with cost $c_0$.

Presented with a word lattice, the lexical head machines for the words present in the lattice are activated. Each lexical head machine consists of a finite set of states, Q, and a costed action table, T. Entries in the action table can be either starting actions, left transitions, right transitions or stopping actions. The notation C(A,m) represents the total cost of a sequence of actions, $A=a_1 \ldots a_k$ undertaken by lexical head machine m in which $a_1$ is a start action and $a_k$ is a stop action. C(A,m) is thus the sum of the costs for actions in the sequence A.

Figure 3:
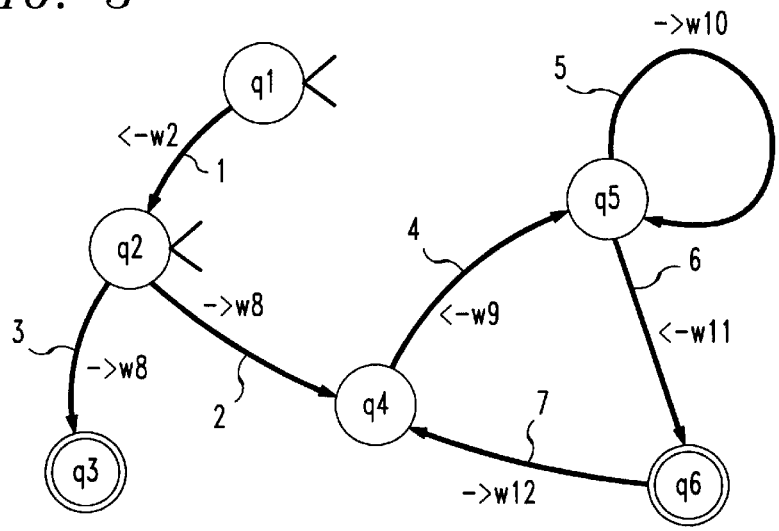
FIG. 3 is diagram showing state transitions for an exemplary lexical head machine according to the present invention.

FIG. 3 is a diagram showing state transitions for an exemplary lexical head machine according to the present invention. Nodes q1–q6 represent various states of the lexical head machine. Arcs between the nodes show state transitions, wherein the head machine is consuming a phrase, indicated by w "n", e.g., w2, etc. The state transitions can be characterized as left or right actions, indicated by the direction of the arrow adjacent to the phrase. For example, the exemplary lexical head machine moves from state 1 to state 2 by consuming phrase w2 in a left transition. The machine keeps track of two position pointers in the string. A left transition moves the left pointer leftwardly and a right transition moves the right pointer rightwardly. The arrow heads at q1 and q2 indicate that there is a finite start action cost at these states. In other words, these are probable starting points for the phrase. The other states have infinite start action costs and thus are improbable starting points for the phrase. The concentric circles at q3 and q6 indicate that there is a finite stop action cost at these states.

The lexical head machine for a word, w, builds or derives a phrase, i.e., an ordering of the words in the lattice, by a series of left or right transitions. In each transition, the phrase is extended by "consuming" an adjacent phrase, which in turn was formed as a "subphrase derivation" by another lexical head machine for a word w'. Such a move corresponds to forming an association between w, "the head," and w', "the dependent". Thus a plurality of such phrases are created by the lexical head machines for the various words as they form associations with other words in the word lattice. An Example of a subphrase derivation, lexical head machines and the actual transitions for those machines, as generated according to the present invention to recognize a sample sentence, are presented later in this specification.

The method proceeds by adding such phrases, in different states of completion, to a phrase lattice. This lattice, distinguished from the word lattice, is a set of phrase records, each corresponding to a particular state of running a lexical head machine for some word. A phrase record has the following fields: <w,s,i,j,q,m,c>. In the record, w is the head of a phrase, possibly incomplete, which spans the positions i to j in its current stage of completion. The phrase is constructed according to lexical head machine m, the current state of m being q. Further, s is the output word list constructed to that point and c is the current score associated with the phrase hypothesis. The current score is the sum of the costs applied to that point in the formation of the phrase.

The cost for a phrase is computed by the lexical head machines. Each move of the head machine adds to the cost of the phrase by an amount that depends on the state of the machine and the identities of the two words w and w'. The phrase or word string selected by the method is the one having the lowest cost that spans the complete word lattice, i.e., from the start of the input speech signal to the end of that signal.

The cost for deriving a phrase spanning the entire lattice involves the costs of machine actions leading to the derivation, together with additional costs for associating machines with words and for associations between each head word and its dependent words. The additional cost parameters include association parameters that specify the cost for a word $w_i$ being the head of word $w_j$ : $C(h(w_i, w_j))$, and lexical parameters that supply the cost for word w running machine m : C(m,w). Each pairing between a word and a machine, together with the corresponding lexical parameter, appears as an entry in a lexicon or dictionary. It should be understood that there may be more than one entry, i.e., machine, per word in the lexicon. The reason for this is that a given word may be used in more than one way, such as, for example, as a noun or a verb.

The cost $C(D_0, w_0)$ of a subphrase derivation, $D_0$, with a head word $w_0$, is the sum of the lexical cost for choosing a machine $m_0$, the cost of machine actions $A_0$ taken by $m_0$ in the derivation, the association parameters for associating $w_0$ with its dependent words $w_1 \ldots w_m$, and the costs of derivations of the subphrases headed by these dependents computed recursively:

$$C(D_0, w_0) = C(m_0, w_0) + C(A_0, m_0) + \sigma_{1 \leq m \leq n} C(h(w_0, w_m)) + C(D_m, w_m)$$

Various cost functions may be used for computing the cost of a phrase. Usually, the cost function is based on probabilities, wherein less probable or less likely word associations lead to higher costs. In this manner, the cost reflects long range associations between words in a string. Cost functions will be described in more detail later in this specification.

The method by which the lexical head machines analyze the word lattice is described in more detail below. In a preferred embodiment, as phrases are extended, a running cost of such phrases is calculated, so that phrases may be pruned as it becomes evident that they will not be part of the lowest cost phrase. A hash table is preferably used for this purpose. The entries in the hash table include a hash key, <w,i,j,q,m>, and a hash value that is a pointer to the phrase record. The hash table maintains a pointer to the lowest cost phrase record found between i and j headed by w in state q of machine m. The information making up the hash key is referred to as a "full state" and c is referred to as the "full state cost."

The method for analyzing the word lattice preferably has a "bottom-up" control structure similar to that for context free parsing algorithms such as CKY as described by Younger and uses data structures similar to those in so called "chart parsing" as described by Early. See, Younger, D., "Recognition and Parsing of Context-Free Languages in Time $n^3$," Information and Control, Vol. 10, pp. 189–208, 1967; Early, J., "An Efficient Context-Free Parsing Algorithm," Comm. Of the ACM, Vol. 14, pp. 453–460, 1970. The present method is driven by the lexical head machines for the words in the word lattice.

Figure 4:
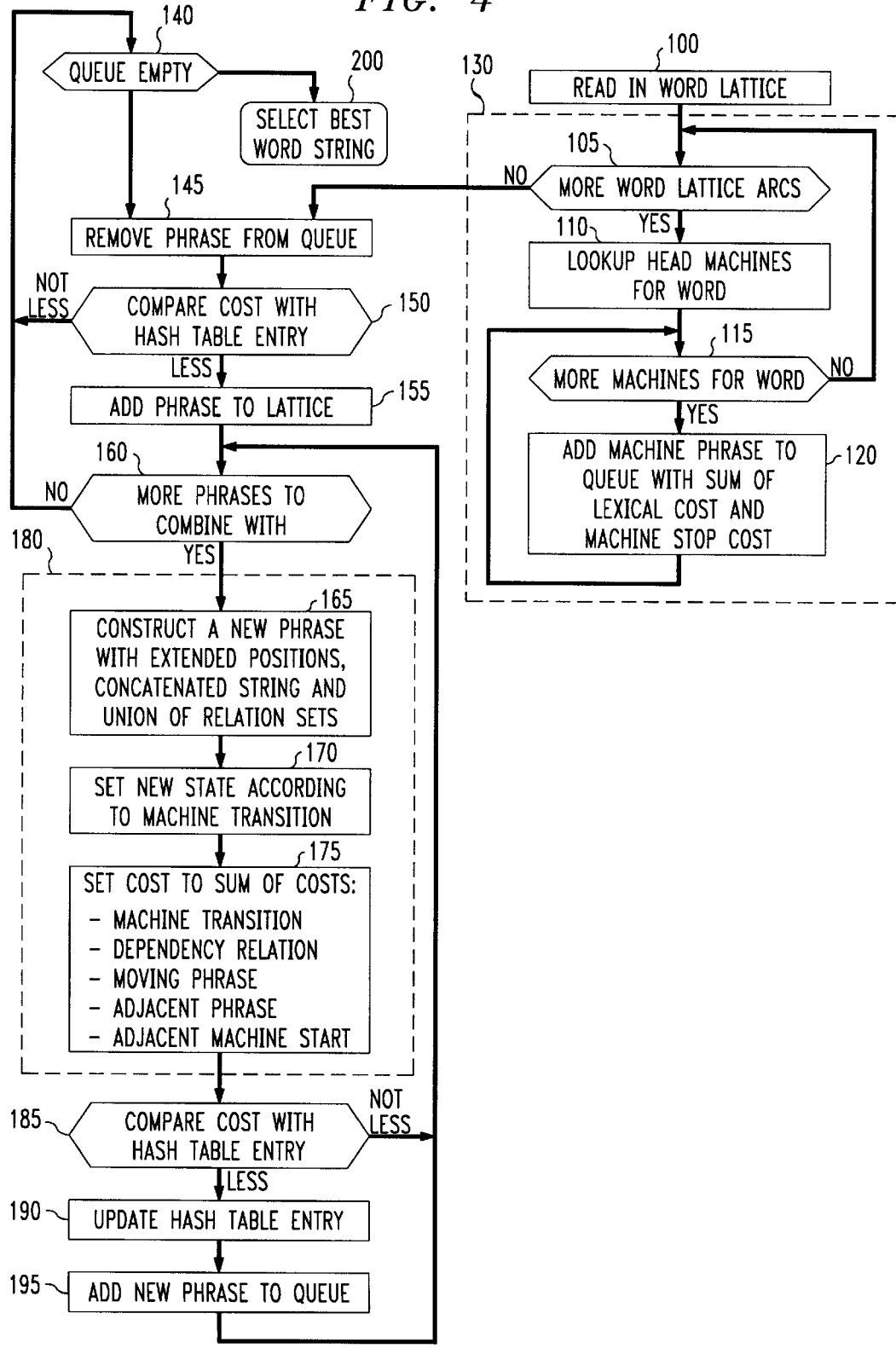
FIG. 4 is an embodiment of a method according to the present invention for generating a plurality of phrase records for selecting the best choice of a plurality of word string hypotheses.

FIG. 4 depicts an embodiment of a method according to the present invention by which the plurality of lexical head machines are used to generate a plurality of phrase records from which a best phrase record, i.e., best word string, is selected. Thus, FIG. 4 illustrates a method according to the present invention for accomplishing step 22 of FIG. 1. As indicated in operation block 100, the word lattice generated by the speech signal processor SSP is received. The method begins with an initialization step, which is accomplished by the operation blocks 105 through 120, collectively identified by the reference numeral 130. Initialization takes place by adding to a queue a set of phrase records <w, [w], i, j, m, $q_0$, c > developed from the word lattice. Such a phrase record is added for each item <w, i, j, $c_0$> in the word lattice and each entry (m, w) in the lexicon. Thus, in operation block 105, a lexical head machine corresponding to one of the words in the word lattice is activated. More specifically, a lexical head machine corresponding to a word, w, from the word lattice is retrieved from a lexicon stored in a memory device. The lexicon entry corresponding to the word w includes a machine, m, and a cost, $c_1 = C(m,w)$. The machine m includes a start action having a cost, $c_2 = C(\text{start}, q_0, m)$. The cost, c, of each phrase record is the sum of lexical cost $c_1$, the machine start cost $c_2$ and the word arc cost $c_0$ assigned by the speech recognizer 10. All lexical head machines for each word arc in the word lattice are activated through the loops sets up by decision blocks 115 and 105.

The remaining operation/decision blocks 140–195 form a loop that consumes items from the queue and creates new phrase records. Decision block 140 queries whether the queue is empty. If the queue is empty, all low cost phrase records that can be developed from the input word lattice have been extended as fully as possible. The phrase lattice, i.e., collection of phrase records, developed by the present methods is then post-processed to select the best word string as indicated in operation block 200. Such post-processing is described later in this specification. If the queue is not empty, processing continues at operation block 145, wherein a phrase record is removed from the queue. In a preferred embodiment of the present method, the cost c of the phrase record is compared with the lowest cost phrase, i.e., the full state cost, in the hash table in block 150. If the cost c of the phrase record under consideration ("the current phrase") is not less the full state cost, the current phrase is discarded or "pruned". Processing then returns to block 140 to determine if another phrase record is available. If the current phrase record has a lower cost than the lowest cost phrase in the hash table, it is added to the phrase lattice in operation block 155. While block 150 is not required as a step in the present method, it improves efficiency because it avoids creating phrase records that will be discarded later.

If, after adding the phrase record to the phrase lattice in operation block 155, the phrase record is adjacent to another phrase, then a combination action may take place. Thus, decision block 160 queries whether or not there are more phrases to combine with. If not, processing loops back to decision block 140. If there are more phrases, a combination operation performed by the operation blocks collectively identified by the reference numeral 180 results in a new record for an extended phrase. The old records still remain in the lattice. Two types of combination are possible, left combination and right combination. In a left combination, the machine for the phrase record to the right undergoes a left action as described below. If the lattice contains a first phrase record <$w_1$, $s_1$, i, k, $m_1$, $q_1$, $c_1$> to the left of a second phrase record <$w_2$, $s_2$, k, j, $m_2$, $q_2$, $C_2$>, $m_2$ includes a left action with a cost, $c_3 = C(\text{left}, q'_2, q_2, m_2)$, and $m_1$ includes a stop action with a cost, $c_4 = C(\text{stop}, q_1, m_1)$, then the combination performed in operation block 165 yields the following extended phrase: <$w_2$, $s'_2$, i, j, $m_2$, _, _>, where $s'_2$ = concatenate ($s_1$, $s_2$). Right combination is the mirror image of left combination. A new state is set in operation block 170, according to the machine transition. In the example above, the new state is $q'_2$, so that the extended phrase becomes: <$w_2$, $s'_2$, i, j, $m_2$, $q'_2$, _>. The cost of the new phrase is determined in operation block 175. The new cost is the sum of machine transition cost, word association cost, consuming phrase cost, consumed phrase cost and consumed machine stop cost. For the above example, the new cost, $c'_2$, is thus given by $c'_2 = c_1 + c_2 + c_3 + c_4 + C(h(w_2, w_1))$. The extended phrase record then becomes: <$w_2$, $s'_2$, i, j, $m_2$, $q'_2$, $c'_2$>.

For each new phrase record resulting from the combination operation 180, the cost of the record is compared, in block 185, with the full state cost in the hash table. If the cost of the new phrase record is higher than the full state cost, then processing returns to operation block 160 without adding the new phrase record to the queue so that it is effectively discarded. If the cost of the new phrase record is less than the full state value, then the hash table entry is updated with the new record pointer in step 190 and the old full state record is removed from the phrase lattice. The new low cost phrase record is then added to the queue in step 195 and processing continues at block 160.

After the queue has been emptied, processing continues at operation block 200, wherein the following steps are performed to select the word string having the lowest cost. First, a list of all lattice records <w, s, j, q, m, c> from an inital node i ∈ I to a final node j ∈ J is compiled. For each record in the list, add the cost for machine m stopping in state q, i.e., C(stop, q, m). Then, select the string s from the record with the lowest total cost. If there are several such spanning phrases with the minimal cost, then one is preferably chosen at random.

Regarding cost parameters, the present methods do not require any specific interpretation of the various cost parameters for machine actions and lexical and association costs other than the general requirement that lower costs correspond to more desirable strings. There are methods known to those skilled in the art for providing specific cost functions applicable to the present methods. Preferably, the cost function is negated log-likelihood. A method for deriving log-likelihood costs for the methods of the present invention is described below. The machine actions, lexical choices and association choices are taken to be events in a generative model, specifically a probabilistic model for generating word strings. A set of input speech utterance signals are transcribed from collected data for the particular speech recognition application. The method illustrated in FIG. 4 for generating phrase records is run over the word lattices produced by speech signal processing, keeping a count of machine actions, lexical machine choices and word association choices leading to the transcribed strings for each speech utterance signal. Next, probabilities are estimated from these counts using standard statistical methods. For each estimated probability P(e) for an event e, set the cost for e to be −log (P(e)).

It should be appreciated that other methods for estimating probabilities known to those skilled in the art can be used such as expectation-maximization. Further, cost functions other than log-likelihood can be used, such as, without limitation, the likelihood ratio. The likelihood ratio is the ratio of the number of times in training that a particular machine action or choice leads to the incorrect string and the number of times that it leads to selecting the transcribed string.

EXAMPLE

Figure 5:
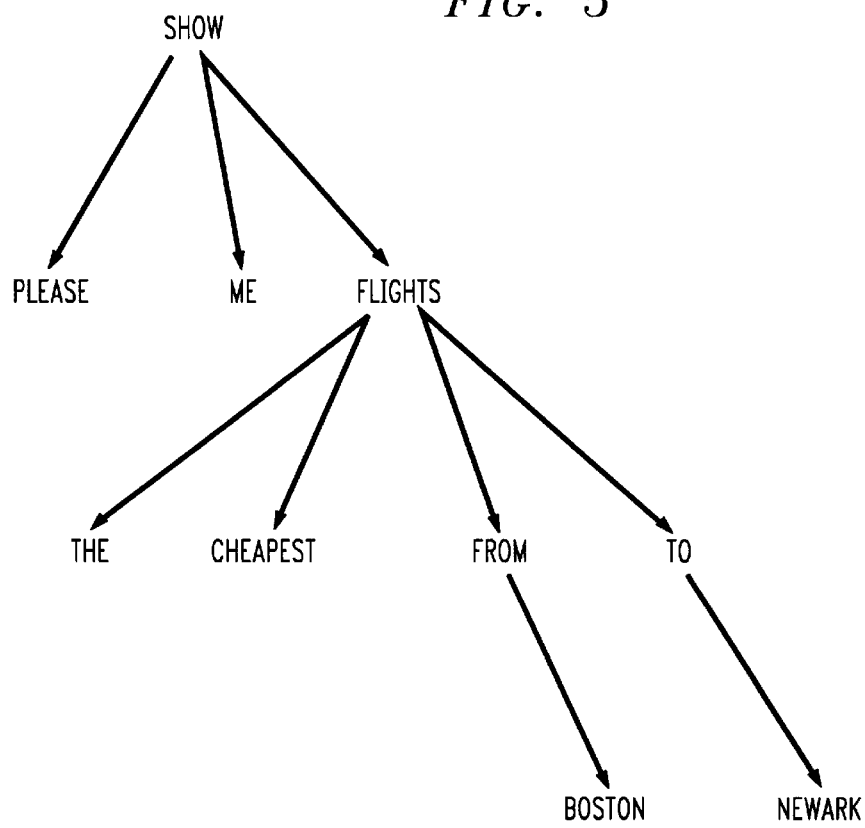
FIG. 5 shows an exemplary subphrase derivation produced by the present methods and apparatus for a sample word string.
Figure 6:
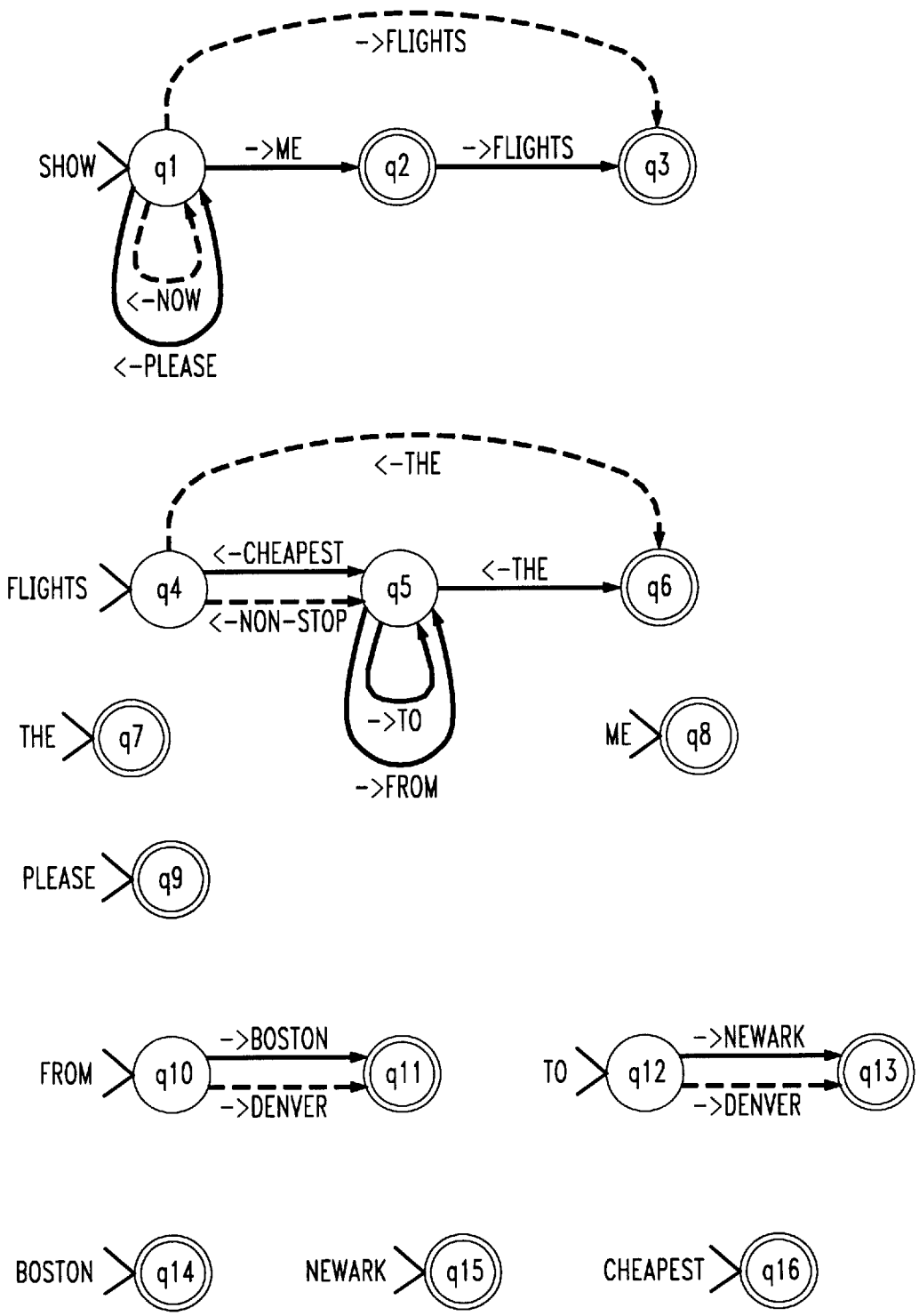
FIG. 6 shows the lexical head machines and the transitions required to generate the subphrase derivation of FIG. 5.

FIG. 5 shows an exemplary subphrase derivation produced by the present methods and apparatus for the string "Please show me the cheapest flights from Boston to Newark". Example lexical head machines associated with the words in this sentence are shown in FIG. 6. The actual transitions required to recognize the string are shown in FIG. 6 as solid lines. A few of the many other possible transitions not taken in this particular derivation are shown as dashed lines. The notation "→" indicates a right transition and the notation "←" indicates a left transition. The words under which the machines would appear in the lexicon are shown next to the start states, i.e., q1, q4, q7, etc.

The transitions taken by the lexical head machines in recognizing the string "Please shown me the cheapest flights from Boston to Newark" that are shown in FIG. 6 are described below. Start actions for all the words in the string are taken: "please" at q9, "show" at q1, "me" at q8, "the" at q7, "cheapest" at q16, "from" at q10, "Boston" at q14, "to" at q12 and "Newark" at q15. The words for the following machines take stop actions since no transitions are possible for them: "please", "me", "the", "cheapest", "Boston" and "Newark". The machine for the word "from" takes a right transition from q10 to q11 consuming the machine for the word "Boston", and stops, forming a completed phrase "from Boston". The machine for the word "to" takes a right transition from q12 to q13 consuming the machine for the word "Newark", and stops, forming a completed phrase "to Boston". This completes the lowest level of the subphrase derivation shown in FIG. 5.

The machine for the word "flights" takes a left transition from q4 to q5 consuming the machine for the word "cheapest", a right transition from q5 back to q5 consuming the phrase "from Boston", another right transition from q5 back to q5 consuming the phrase "to Newark", a left transition form q5 to q6 consuming the machine for the word "the", and stops. This completes the recognition of the phrase "the cheapest flights from Boston to Newark" corresponding to the two lower levels of the subphrase derivation shown in FIG. 5.

The machine for the word "show" takes a left transition from q1 back to q1 consuming the machine for the word "please", a right transition from q1 to q2 consuming the machine for the word "me", a right transition from q2 to q3 consuming the phrase headed by "flights", i.e., "the cheapest flights from Boston to Newark", and stops. This completes the entire derivation shown in FIG. 5, and the recognition of "Please shown me the cheapest flights form Boston to Newark."

It should be understood that the embodiments described herein are illustrative of the principles of this invention and that various modifications may occur to, and be implemented by, those skilled in the art without departing from the scope and spirit of this invention. For example, while the embodiments described herein relate to speech recognition, the present methods can be utilized in other types of language recognition systems.

I claim:

1. A method for language recognition, wherein a signal indicative of the language to be recognized is generated, comprising the steps of:
   generating candidate word strings for the signal;
   selecting among the candidates using a language model utilizing a plurality of finite state machines, each machine having the ability to recognize a pair of sequences, one sequence scanned leftwards, the other scanned rightwards, and each machine corresponding to a word in a vocabulary of the language model.

2. The method of claim 1 wherein the step of selecting further comprises utilizing only finite state machines corresponding to the words contained in the candidate word strings.

3. The method of claim 1 wherein the step of generating candidate word strings further comprises generating such word strings in the form of a word lattice.

4. The method of claim 1 wherein the step of selecting further comprises utilizing the finite state machines to derive phrases from the words contained in the candidate word strings and compute a cost for the derived phrases, wherein the cost relates to the degree of correspondence betweeen the derived phrase and the language represented by the signal.

5. The method of claim 4 wherein a lower cost indicates a greater degree of correspondence.

6. The method of claim 5 wherein the step of selecting further comprises determining the lowest cost phrase.

7. The method of claim 4 wherein the cost of a phrase is based on probabilities, wherein less probable word associations result in higher costs.

8. The method of claim 4 wherein costs are applied incrementally as phrases are derived.

9. The method of claim 1 wherein the language to be recognized is spoken and the step of generating candidate word strings further comprises applying an acoustic model.

10. A computer-readable storage medium comprising encoded computer-readable program instructions for use in conjunction with a programmable computer, which instructions cause the computer to select a language string from a plurality of language string hypotheses, the selected string providing the best correspondence to a signal representative of language, wherein such selection results from the action of a plurality of finite state machines capable of recognizing a pair of sequences, one sequence scanned leftwards, the other scanned rightwards through a data structure based on the plurality of language string hypotheses.

11. The computer-readable storage medium of claim 10 wherein the data structure is a phrase lattice comprised of phrases formed by the plurality of finite state machines.

12. The computer-readable storage medium of claim 10 wherein the language recognition system is a speech recognition system, the language string hypotheses are presented in the form of a word lattice and wherein the finite state machines that are acting correspond to the words in the word lattice.

13. A method for selecting a word string from a plurality of word string hypotheses, wherein the word string hypotheses are derived from an input signal representative of language and the selected word string best represents the language, comprising the steps of:
   (a) activating state machines that correspond to the words in the word string hypotheses, wherein the activated state machines are selected from a plurality of such state machines defining a lexicon, wherein each of the activated state machines are capable of recognizing a pair of sequences, one sequence scanned leftwards, the other scanned rightwards, and further wherein each state machine is characterized by an initial state;
   (b) generating a first plurality of phrase records, wherein, a phrase record is generated for each word in the word string hypotheses and each phrase record is characterized by a word, a state machine, the initial state, and a cost;
   (c) generating a phrase lattice by forming a data structure comprised of the phrase records of step (b);
   (d) generating a plurality of extended phrase records, wherein an extended phrase record is formed when a phrase record within the phrase lattice consumes an adjacent phrase record in the phrase lattice by a state machine transition, wherein, the extended phrase record:

contains the words of both the phrase record and the adjacent phrase record, and is characterized by the state machine of the consuming phrase record, a new state corresponding to the transition of the state machine, and a new cost, wherein, the new cost is the sum of the costs of the consumed phrase and the consuming phrase, a cost associated with the state machine transition of the consuming phrase and a cost associated with a stop undertaken by the consumed state machine, and a cost pertaining to an association between the words in the consumed and consuming phrase records;

(e) adding the extended phrase record to the phrase lattice if the new cost of the extended phrase record is lower than a reference phrase record cost;

(f) repeating steps (d) and (e) wherein a phrase record can consume an adjacent phrase record until all phrase records have been fully extended and wherein the reference phrase record cost is updated by the extended phrase records added to the phrase lattice; and (g) selecting the lowest cost phrase record spanning the entire input signal.

* * * * *